(12) United States Patent
Holmes et al.

(10) Patent No.: US 6,551,208 B1
(45) Date of Patent: Apr. 22, 2003

(54) THREE-MODE, COMPOUND-SPLIT, ELECTRICALLY-VARIABLE TRANSMISSION

(75) Inventors: Alan G. Holmes, Fishers, IN (US); Michael Roland Schmidt, Carmel, IN (US); Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/981,417

(22) Filed: Oct. 18, 2001

(51) Int. Cl.⁷ ............................................... F16H 3/72
(52) U.S. Cl. ............................................... 475/5; 180/65.7
(58) Field of Search ............................ 475/5, 151, 277, 475/279; 180/65.4, 65.7; F16H 3/72

(56) References Cited

U.S. PATENT DOCUMENTS

| | | | |
|---|---|---|---|
| 5,558,173 A | 9/1996 | Sherman | 180/53.8 |
| 5,558,175 A | 9/1996 | Sherman | 180/65.2 |
| 5,558,588 A * | 9/1996 | Schmidt | 475/5 |
| 5,558,589 A | 9/1996 | Schmidt | 475/5 |
| 5,558,595 A | 9/1996 | Schmidt et al. | 477/3 |
| 5,571,058 A | 11/1996 | Schmidt | 475/5 |
| 5,577,973 A | 11/1996 | Schmidt | 475/5 |
| 5,603,671 A * | 2/1997 | Schmidt | 475/5 |
| 5,730,676 A * | 3/1998 | Schmidt | 475/5 |
| 5,931,757 A | 8/1999 | Schmidt | 475/2 |
| 5,935,035 A * | 8/1999 | Schmidt | 475/5 |
| 6,090,005 A | 7/2000 | Schmidt et al. | 475/5 |
| 6,358,173 B1 * | 3/2002 | Klemen et al. | 475/5 |
| 6,371,878 B1 * | 4/2002 | Bowen | 475/5 |
| 6,478,705 B1 * | 11/2002 | Holmes et al. | 475/5 |
| 2002/0142876 A1 * | 10/2002 | Holmes et al. | 475/5 |

* cited by examiner

Primary Examiner—Richard M. Lorence
Assistant Examiner—Dennis Abdelnour
(74) Attorney, Agent, or Firm—Leslie C. Hodges

(57) ABSTRACT

An electrically-variable transmission has three modes of operation. The power in each of the modes of operation is split by differential gearing into a mechanical path and an electrical path between the input shaft of the transmission and the output shaft of the transmission. This is accomplished with three planetary gearsets and four torque-transmitting mechanisms that are judiciously engaged to provide the three modes of operation, which are an input-split mode and two compound-split modes. The transmission can be part of a system with electrical storage devices, which will supplement the engine power during some periods of operation.

8 Claims, 3 Drawing Sheets

THREE-MODE, COMPOUND-SPLIT, ELECTRICALLY-VARIABLE TRANSMISSION

TECHNICAL FIELD

The present invention relates to vehicular transmissions and, more particularly, to vehicular transmissions having both electrical and mechanical drive paths to provide split-mode operation within the transmission between an input shaft and an output shaft.

BACKGROUND OF THE INVENTION

The electrically-variable transmission (EVT) has been proposed for vehicles to improve fuel economy and reduce emissions. The EVT splits mechanical power between an input shaft and an output shaft into a mechanical power path and an electrical power by means of differential gearing. The mechanical power path may include clutches and additional gears. The electrical power path may employ two electrical power units, each of which may operate as a motor or as a generator. With an electric storage battery, the EVT can be incorporated into a propulsion system for a hybrid electric vehicle.

The hybrid vehicle or hybrid propulsion system uses an electrical power source, such as batteries, as well as an engine power source. The batteries are connected with the electrical drive units through an electronic control unit (ECU), which distributes the electrical power as required. The ECU also has connections with the engine and vehicle to determine operating characteristics, or operating demand, so that the electrical power units are operated properly as either a motor or a generator. When operating as a generator, the electrical power unit accepts power from either the vehicle or the engine and stores power in the battery, or provides that power to operate another electrical device or another electrical power unit on the vehicle or on the transmission.

There have been a number of electrically-variable transmissions proposed for vehicle operation. Examples of proposed electrically-variable transmissions are shown in U.S. Pat. No. 5,558,589 issued to Schmidt on Sep. 24, 1996, and assigned to the assignee of the present invention; U.S. Pat. No. 6,090,005 issued to Schmidt et al. on Jul. 18, 2000, and assigned to the assignee of the present invention; and U.S. Pat. No. 5,931,757 issued to Schmidt on Aug. 3, 1999, and assigned to the assignee of the present invention. The above-identified U.S. Pat. No. 5,931,757 defines the structure and operation of a variable two-mode, input-split, electro-mechanical transmission for a parallel hybrid electric propulsion system. The U.S. Pat. No. 5,558,589 discloses a two-mode, compound-split, electro-mechanical vehicular transmission, and U.S. Pat. No. 5,558,595 issued to Schmidt et al. on Sep. 24, 1996, discloses a one-mode, input-split transmission. These, and many other patents, describe various electrically-variable type transmissions.

One of the benefits of having an electrically-variable transmission incorporating more than one mode of operation is that each mode of operation will generally incorporate at least one mechanical point where one of the electrical power units is stationary, thereby reducing the electrical power input and providing a pure mechanical power flow path which is, of course, more efficient than a pure electrical power flow path.

Other hybrid type power transmissions are shown in U.S. Pat. No. 5,571,058 issued to Schmidt on Nov. 5, 1996; U.S. Pat. No. 5,577,973 issued to Schmidt on Nov. 26, 1996; U.S. Pat. No. 5,558,173 issued to Sherman on Sep. 24, 1996; and U.S. Pat. No. 5,558,175 issued to Sherman on Sep. 24, 1996, all of which are assigned to the assignee of the present invention.

SUMMARY OF THE INVENTION

It is an object of the present invention to provide an improved three-mode, input-split and compound-split electrically-variable transmission.

In one aspect of the present invention, the electrically-variable transmission has an input-split first mode of operation.

In another aspect of the present invention, the electrically-variable transmission has a compound-split mode during the second mode of operation.

In still another aspect of the present invention, the electrically-variable transmission has another compound-split power path during a third mode of operation.

In yet still another aspect of the present invention, the electrically-variable transmission incorporates a mechanical power source, two electrical power units, and three planetary gear sets.

In a further aspect of the present invention, the electrically-variable transmission incorporates four torque-transmitting mechanisms that are selectively engageable to provide the three modes of operation.

In yet a further aspect of the present invention, the four torque-transmitting mechanisms are operated in combinations of two to provide the three modes of operation.

In yet still a further aspect of the present invention, the electrically-variable transmission has a neutral condition with two of the torque-transmitting mechanisms engaged, wherein the transmission can operate in either the forward mode or a reverse mode from the neutral condition depending on the speed of one of the electrical power units.

DESCRIPTION OF THE EXEMPLARY EMBODIMENT

Figure 1:
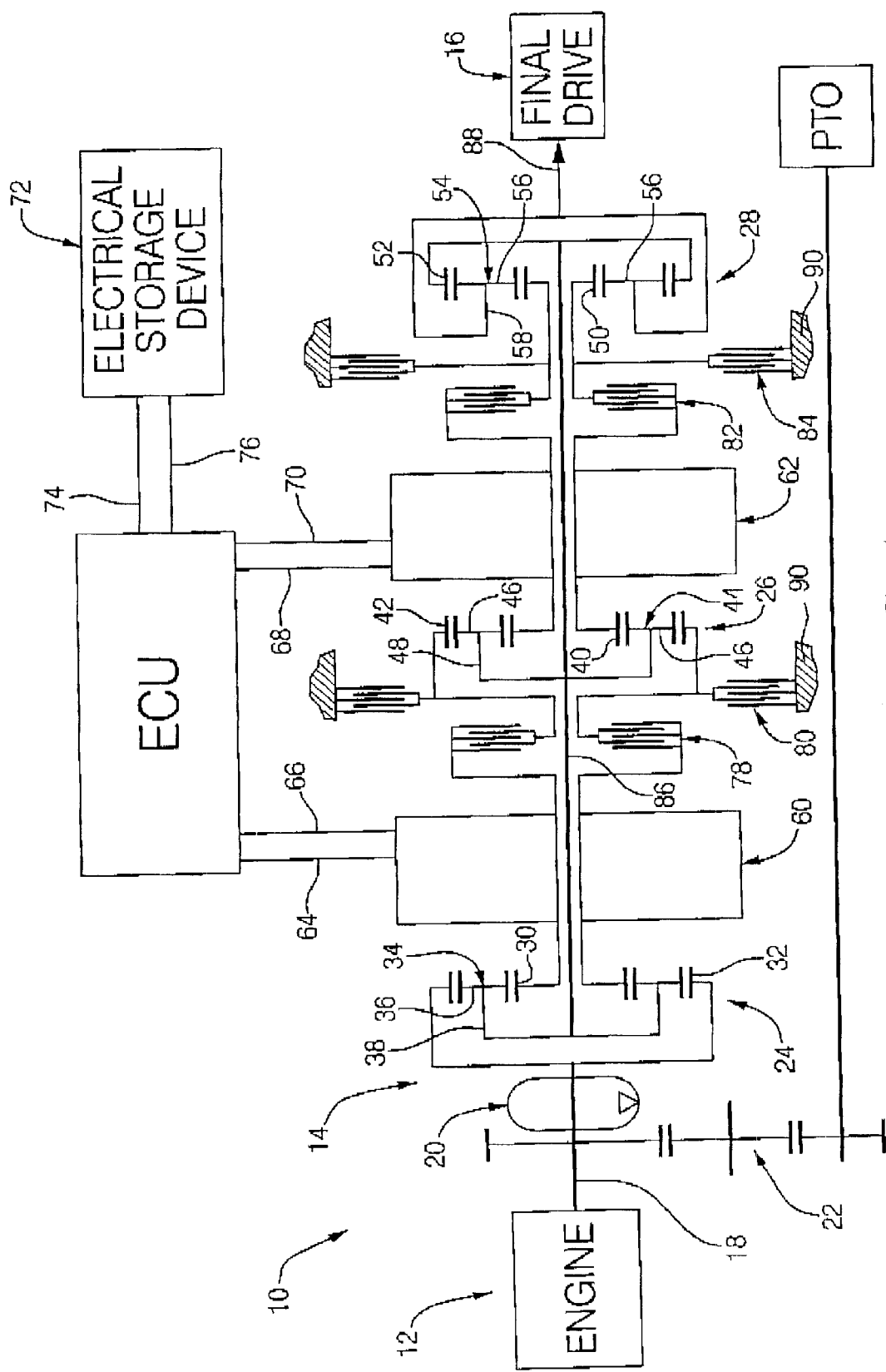
FIG. 1 is a schematic representation of one embodiment of the present invention incorporated in a hybrid electric vehicle propulsion system.

Referring to the drawings, wherein like characters represent the same or corresponding parts throughout the several views, there is seen in FIG. 1 a powertrain 10 incorporating an engine 12, an electrically-variable transmission 14, and a final drive mechanism 16. The electrically-variable transmission 14 has an input shaft 18 continuously connected with the engine 12 and driving a main pump 20, and a power takeoff (PTO) gear unit 22. The power takeoff gear unit 22 drives a conventional PTO, which supplies mechanical power for accessory mechanisms that might be connected with the transmission.

The transmission 14 includes three planetary gearsets 24, 26, and 28. The planetary gearset 24 includes a sun gear member 30, a ring gear member 32, and planet carrier assembly member 34. The planet carrier assembly member 34 includes a plurality of pinion gears 36 that are rotatably mounted on a planet carrier 38 disposed in meshing relationship with both the sun gear member 30 and the ring gear member 32.

The planetary gearset 26 includes a sun gear member 40, a ring gear member 42, and a planet carrier assembly member 44. The planet carrier assembly member 44 includes a plurality of pinion gears 46 that are rotatably mounted on planet carrier 48 and disposed in meshing relationship with both the sun gear member 40 and the ring gear member 42.

The planetary gearset 28 includes a sun gear member 50, a ring gear member 52, and a planet carrier assembly member 54. The planet carrier assembly member 54 includes a plurality of pinion gears 56 that are rotatably mounted on a planet carrier 58 and disposed in meshing relationship with the sun gear member 50 and the ring gear member 52.

Further incorporated into the electrically-variable transmission 14 is a pair of electrical power units 60 and 62 that are controlled by a conventional electronic control unit (ECU). The ECU is connected with the electrical power unit 60 through a pair of electrical conductors 64 and 66, and is connected with the electrical power unit 62 through a pair of electrical conductors 68 and 70. The ECU is also communicated with an electrical storage device 72, which is connected with the ECU through a pair of electrical conductors 74 and 76. The electrical storage device is generally one or more electrical batteries.

The electrical power units 60 and 62 are preferably motor/generator units, which, as is well known, can operate as either a power supplier or as a power generator. In operating as a motor or power supplier, the electrical power units will supply power to the transmission and, when operating as generators, will take electrical power from the transmission, and the ECU will either distribute the power in the electrical storage device 72 and/or distribute the power to the other power unit which is operating as a motor at that time.

The electrically-variable transmission 14 employs four torque-transmitting mechanisms 78, 80, 82, and 84. The torque-transmitting mechanisms 78 and 82 are rotating-type torque-transmitting mechanisms, commonly termed clutches, and the torque-transmitting mechanisms 80 and 84 are stationary-type torque-transmitting mechanisms, commonly termed brakes. Each of the torque-transmitting mechanisms 78, 80, 82, and 84, as shown in FIG. 1, are hydraulically-operated, selectively engageable friction devices. The hydraulic power to operate the clutches is supplied by the pump 20. The ECU provides electronic control signals that are effective on conventional valve mechanisms to distribute fluid to and exhaust fluid from the torque-transmitting mechanisms in a well-known manner.

The input shaft 18 is continuously connected with the ring gear member 32, and the sun gear member 30 is continuously connected with the electrical power unit 60. The planet carrier assembly member 34 is connected through a main shaft 86 with both the planet carrier assembly member 44 and the ring gear member 42. The sun gear member 40 is continuously connected with the electrical power unit 62. The planet carrier assembly member 54 is continuously connected with the final drive mechanism 16 through an output shaft 88.

The torque-transmitting mechanism 78 selectively interconnects the sun gear member 30 and the electrical power unit 60 with the ring gear member 42 of the planetary gearset 26. The torque-transmitting mechanism 80 selectively connects the ring gear member 42 with a stationary transmission housing 90 of the powertrain 10. The torque-transmitting mechanism 82 selectively interconnects the sun gear member 40 and electrical power unit 62 with the sun gear member 50. The torque-transmitting mechanism 84 selectively connects the sun gear member 50 with the stationary housing 90.

As is well known in electrical controls of power transmissions, the ECU receives a number of electrical signals from the vehicle and transmission, such as engine speed, vehicle speed, throttle demand, to name a few. These electrical signals are used as input signals for the programmable-type digital computer, which is incorporated within the ECU. The computer is then effective to distribute the electrical power as required to permit the operation of the transmission in a controlled manner.

During normal operation, the engine 12 supplies mechanical power to the ring gear member 32. The electrical power unit 60 either supplies power to the sun gear member 30 or accepts power from the sun gear member 30. The electrical power unit 62 either supplies to the sun gear member 40 or accepts power from the sun gear member 40.

If the torque-transmitting mechanism 78 is engaged, the electrical power unit 60 is connected with the ring gear member 42 and either supplies or accepts power through the ring gear member 42 as well as the sun gear member 30. When the torque-transmitting mechanism 82 is engaged, the electrical power unit 62 accepts power from or delivers power to the sun gear member 50 as well as the sun gear member 40. When the torque-transmitting mechanism 80 is engaged, the sun gear member 40 is held stationary and becomes a reaction member within the planetary gearset 26. When the torque-transmitting mechanism 84 is engaged, the sun gear member 50 becomes a reaction member within the planetary gearset 28. When the torque-transmitting mechanism 84 is engaged, the sun gear member 50 is a reaction member and the power of the main shaft 86 will be transmitted through the ring gear member 52 to the planet carrier assembly member 54 and therefore to the output shaft 88. When the torque-transmitting mechanism 80 is engaged, the electrical power unit can either accept power from or deliver power to the main shaft 86 through the planetary gearset 26.

The judicious selection of the engagement of the torque-transmitting mechanisms 78, 80, 82, and 84 in combinations of two will establish three modes of operation within the electrically-variable transmission 14. The engagement of the torque-transmitting mechanisms 80 and 84 establishes a first mode of operation; the engagement of the torque-transmitting mechanisms 78 and 84 establishes a second mode of operation, and the engagement of the torque-transmitting mechanisms 78 and 82 establishes a third mode of operation.

The first mode of operation is an input-split mode of operation, while the second and third modes are compound-split modes of operation. There are, of course, other combinations of engagements of the torque-transmitting mechanisms that will permit other operating conditions. For example, with the torque-transmitting mechanisms 78 and 80 engaged simultaneously, the electrical power unit 62 can be utilized as a motor to supply power to the main shaft 86 and thereby provide starting torque for the engine 12. If all four of the torque-transmitting mechanisms are engaged simultaneously, the input shaft 18 and the output shaft 88 are effectively grounded and therefore no power can be transmitted, thus producing a "park gear" arrangement if desired. The simultaneous disengagement of all of the torque-transmitting mechanisms provides a positive neutral condition.

Figure 2:
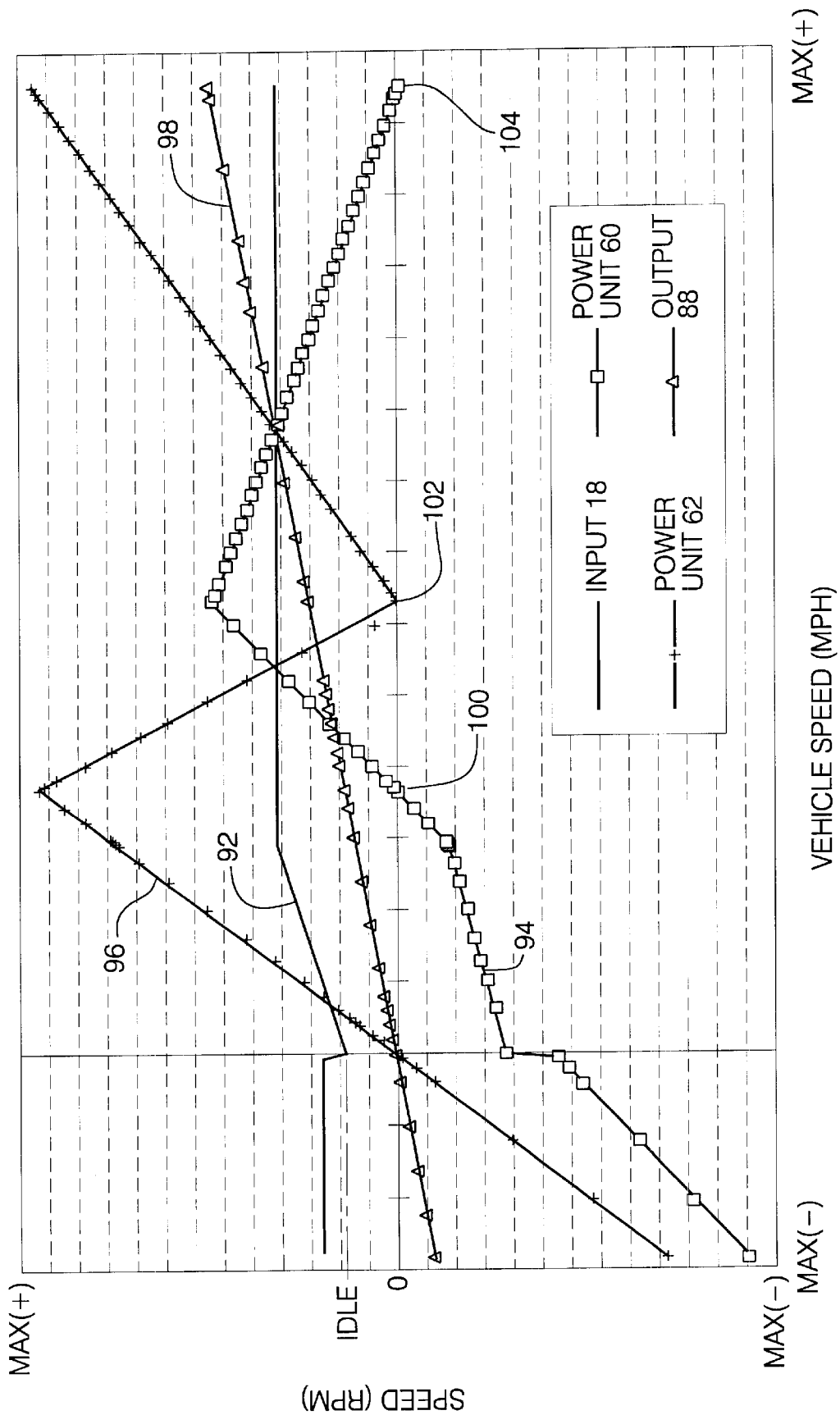
FIG. 2 is a plurality of curves representing the speeds of components of the electrically-variable transmission of FIG. 1 versus the speed of the vehicle or output speed of the transmission.

The curve or chart shown in FIG. 2 provides a graphical illustration of the speeds of the various components within the transmission, as well as the speed of the engine, during the three modes of operation and during an idle condition.

For purposes of the following discussion, the rotational direction of the engine will be considered forward or positive, and the rotational direction opposite the engine will be considered reverse or negative. During the first mode of operation, the torque-transmitting mechanisms 80 and 84 are engaged. In a neutral condition, the engine is at an idle speed as depicted in FIG. 2, and the speed of the electrical power unit 60 is negative or reverse, such that the speed of the planet carrier assembly member 34 is zero, as shown at the zero-to-zero point on the curve of FIG. 2. Also, curve of FIG. 2, the engine speed is represented by a line 92, the speed of electrical power unit 60 is represented by the line 94, the speed of the electrical power unit 62 is represented by the line 96, and the speed of the transmission output shaft 18 is represented by the line 98.

When the powertrain 10 is being operated in the neutral condition, the vehicle can be moved in either a forward direction or a reverse direction. For movement in the reverse direction, the negative or reverse speed of the electrical power unit 62 is permitted to increase, thereby increasing the speed of the planet carrier assembly member 34 in the negative direction. The electrical power unit 62 is operated as a motor to assist in driving the vehicle and therefore adding power to the transmission at the sun gear member 40, which is distributed to the main shaft 86 by the planet carrier assembly member 44. This power is transmitted to the ring gear member 52 by planetary gearset 28 and then through the planet carrier assembly member 54 through the output shaft 88. As is noted, the vehicle can be moved in the reverse direction from the neutral condition. Also, during the reverse operation, the speed of the engine 12 is increased from the idle speed to an elevated speed.

To operate in the forward direction, the engine 12 is accelerated from the idle speed, the speed of the electrical power unit 60 (operating as a generator) is decreased, and the speed of the electrical power unit 62 operating as a motor is increased. This operation will continue until the point 100 is reached. This is the end of the first mode of operation. This first mode of operation is an input-split type of power transmission.

At the point 100 on curve of FIG. 2, the ring gear member 42 is stationary as held by the torque-transmitting mechanism 80, and as noted on curve of line 94, the speed of the electrical power unit 62 is also zero. At this point, the torque-transmitting mechanisms 80 and 78 can be interchanged in a synchronous condition, such that there is no slippage involved in either the engagement or disengagement of these devices. It should also be noted that at this point, the transmission is operating in a substantially mechanical power flow arrangement and the electrical losses from either unit 60 or 62 are small and negligible. At this interchange point from mode one to mode two, the operation of the electrical power unit 62 is changed from being a motor to being a generator. Also at this interchange point, the operation of electrical power unit 60 changes from a generator mode to a motor mode. It will be noted from the curve line 92 that the engine speed is essentially fixed at this point. That is, the engine is operating at its governed speed.

To continue to accelerate the vehicle during the second mode of operation, which is a compound-split mode, the speed of the electrical power unit 60 (operating as a motor) is increased and the speed of the electrical power unit 62 (operating as a generator) is decreased. Both the electrical power unit 60 and the engine 12 impart positive or forward rotation to the planet carrier assembly member 36, and the electrical power unit 62 provides a rotating reaction member at the sun gear member 40 of the planetary gearset 26. The electrical energy generated by the electrical power unit 62 can be utilized to either recharge the electrical storage device 72, provide electrical power to drive the electrical power unit 60, or to do both depending upon the amount of power needed at the electrical power unit 60 and the level of charge of the electrical storage device 72.

The powertrain 10 continues to operate in the second mode until the point 102 is reached in FIG. 2. At this point, the speed of the electrical power unit 62 has decreased to zero and the speed of the electrical power unit 60 has increased to a maximum value. At this point, the electrical power unit 62 has a zero speed, which is equal to the speed of the sun gear member 50 as held stationary by the torque-transmitting mechanism 84. Therefore, at this interchange point, the torque-transmitting mechanisms 82 and 84 can be interchanged in a synchronous manner, wherein no slippage occurs during the ratio interchange. This is the end of the second mode of operation and the beginning of the third mode of operation.

The third mode of operation is also a compound-split mode of operation. During the third mode of operation, the electrical power unit 60 is operated as a generator and the electrical power unit 62 is operated as a motor. As can be seen in FIG. 2, the speed of the electrical power unit 60 is decreasing while the speed of the electrical power unit 62 is increasing. The sun gear member 50 and the planet carrier assembly member 54 are both driven in a forward or positive direction. The sun gear member 50 is driven by the electrical power unit 62, and the ring gear member 52 is driven by both the engine 12 through the planetary gearset 24 and the electrical power unit 62 through the planetary gearset 26. During the third mode of operation, the electrical power unit 60 supplies electrical power to the system which can be utilized to power the electrical power unit 62 as a motor and/or provide energy to the electrical storage device 72 to increase the storage charge of that member. The third mode of operation can continue until the vehicle reaches a maximum speed point at 104 on the curve of FIG. 2.

The curves shown on FIG. 2 are for maximum power flow through the vehicle. That is, the engine is operated at its maximum throttle condition and each of the electrical power units is operating at its maximum electrical generation and/or power output conditions. The powertrain 10 can be operated at lesser power flows if the engine throttle is reduced to below the maximum throttle condition shown in FIG. 2. If the engine speed is reduced, the ECU will accommodate with lesser engine speed and provide the desired control signals to the electrical power units 60 and 62, as well as the torque-transmitting mechanisms 78, 80, 82, and 84, such that the operating points 100, 102, and 104 will still be achieved but at lesser vehicle speeds. The operating points 100, 102, and 104 are important operating points in that each of these is a mechanical operating point where the amount of electrical energy being distributed through the powertrain 10 is at a minimum and the mechanical power flow is a maximum or greater percentage of the total power flow. As is well known, this results in a substantial increase in operating efficiency for the powertrain 10.

Figure 3:
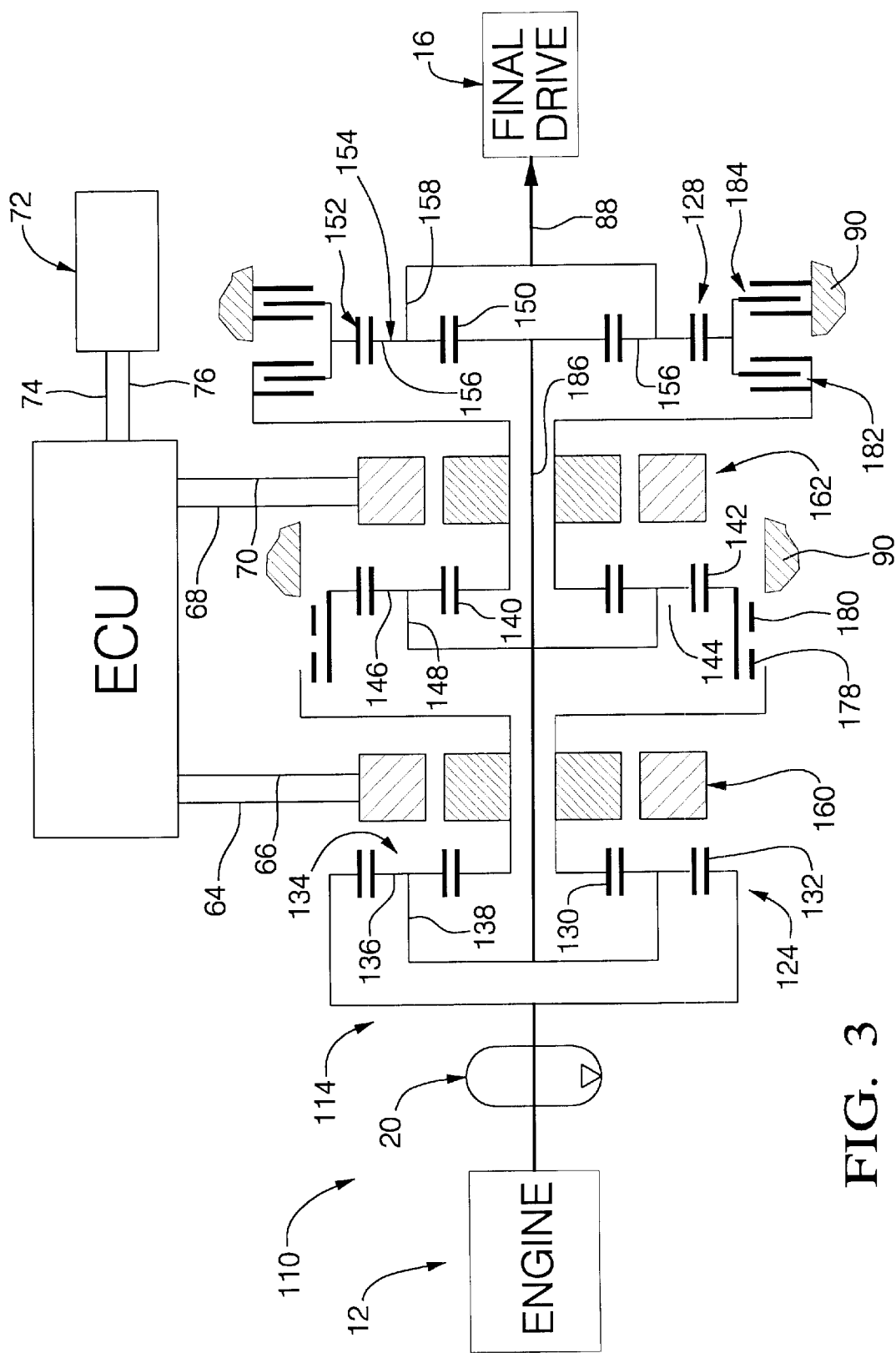
FIG. 3 is a schematic representation of an alternative embodiment of the present invention incorporated in a hybrid powertrain.

A powertrain 110, shown in FIG. 3, provides an alternative embodiment for the present invention. Powertrain 110 includes the engine 12, the pump 20, the final drive mechanism 16, and an alternative electrically-variable transmission 114. The transmission 114 includes three planetary gearsets 124, 126, and 128.

The planetary gearset 124 includes a sun gear member 130, a ring gear member 132, and a planet carrier assembly member 134. The planet carrier assembly member 134 includes a plurality of pinion gears 136 that are rotatably mounted on a planet carrier 138 and disposed in meshing relationship with both the sun gear member 130 and the ring gear member 132.

The planetary gearset 126 includes a sun gear member 140, a ring gear member 142, and a planet carrier assembly member 144. The planet carrier assembly member 144 includes a plurality of pinion gears 146 that are rotatably mounted on a planet carrier 148 and disposed in meshing relationship with both the sun gear member 140 and the ring gear member 142.

The planetary gearset 128 includes a sun gear member 150, a ring gear member 152, and a planet carrier assembly member 154. The planet carrier assembly member 154 includes a plurality of pinion gears 156 that are rotatably mounted on a planet carrier 158 and disposed in meshing relationship with both the sun gear member 150 and the ring gear member 152.

The electrically-variable transmission 114 also includes two electrical power units 160 and 162, which are communicated with the ECU, the same as the electrical power units 60 and 62, shown in FIG. 1. The electrically-variable transmission 114 also includes a plurality of torque-transmitting mechanisms 178, 180, 182, and 184. The torque-transmitting mechanisms 182 and 184 are friction-type torque-transmitting mechanisms, similar to those shown as 82 and 84, respectively, in FIG. 1. The torque-transmitting mechanisms 178 and 180 are preferably sliding mechanical-type torque-transmitting mechanisms.

The torque-transmitting mechanism 178 will provide a drive engagement between the electrical power unit 160 and the ring gear member 142. The torque-transmitting mechanism 180 will provide a connection between the ring gear member 142 and the transmission housing 90. The torque-transmitting mechanisms 178 and 180 are designed such that they will simultaneously engage their respective members when in a middle or neutral condition. Under this circumstance, the electrical power unit 60 and therefore sun gear member 30 is held stationary, which will permit the electrical power unit 62 to provide starting torque for the engine 12. The torque-transmitting mechanisms 178 and 180 can be moved from there to engage the first mode of operation in which the torque-transmitting mechanisms 180 and 184 are simultaneously engaged. The operation of the powertrain 110 is the same as the operation of the powertrain 10, depicted in FIG. 1.

The planetary gearset 128 is slightly different from the planetary gearset 28 in that the connections are arranged differently. The sun gear member 150 is continuously connected with a main transmission shaft 186, while the ring gear member 152 is selectively connectible with either the transmission housing 90 or the electrical power unit 162. The planet carrier assembly member 154 is connected with the output shaft 88, the same as the planet carrier assembly member 54 is connected with the output shaft 88. This change in mechanical connections does not affect the operation of the powertrain 110. It merely changes the power flow in the planetary gearset 128 such that power flows through the sun gear member 150 to the planet carrier assembly member 154 during the first and second modes of operation, and through both the sun gear member 150 and ring gear member 152 during the third mode of operation.

Other configurations of the planetary gearsets are possible without changing the spirit or scope of the present invention. For example, the planetary gearset at the output shaft, that is 28 or 128, can be a compound-type planetary gearset wherein meshing pinion gears are arranged on a single carrier and disposed between the sun gear member and the ring gear member. These minor changes will be well known to those skilled in the art of power transmissions.

In both of the embodiments shown, the electrically-variable transmission has three modes of operation: an input power split mode for launching the vehicle from rest; a compound power split mode for low speed ratio cruising; and a second compound-split mode for high speed cruising. Each of the transmissions incorporate three planetary gearsets and two electrical power units that can operate as either motors or generators, and four torque-transmitting mechanisms that are operable to selectively interconnect the electrical power units in the planetary gearsets in the desired fashion to accomplish the three modes of operation.

In both of the embodiments shown, the input power split requires only one gearset, which provides a differential gearset between the first of the electrical power units and the power input from the engine. The second of the electrical power units absorbs power from the transmission and does not contribute to the power flow between the input shaft of the transmission and the output shaft of the transmission. Each of the compound-split modes requires more than one planetary gearset. The torque-transmitting mechanisms are interchanged judiciously to connect the planetary gearsets in the desired arrangement for each of the higher two modes of operation. The interchanges from the input power split mode to the first compound-split mode, and from the first compound-split mode to the second compound-split mode, are each accomplished at a synchronous shift point. At these shift points, the on-coming and off-going torque-transmitting devices control a number that is at essentially speed, thereby reducing or eliminating any slippage between the components to be controlled by the torque-transmitting mechanism during the ratio interchange as in the mode interchange.

Those skilled in the art will recognize that the transmissions described above provide an electrically-variable transmission that has three modes of operation, an input-split mode and two compound-split modes, that are accomplished with three planetary gearsets and four torque-transmitting mechanisms.

What is claimed is:

1. An electrically-variable transmission comprising:
    a transmission input shaft;
    a first planetary gear set having first, second, and third members, said first member being continuously interconnected with said input shaft;
    a first electrical power unit continuously interconnected with said second member of said first planetary gear set;
    a second planetary gear set having first, second, and third members with said first member being continuously interconnected with said third member of said first planetary gear set;
    a second electrical power unit continuously interconnected with said second member of said second planetary gear set;
    a third planetary gear set having three members, said first member being continuously interconnected with both said third member of said first planetary gear set and with said first member of said second planetary gear set, said second member of said third planetary gear set being continuously interconnected with a transmission output shaft;

a first torque transmitting mechanism selectively interconnecting said first electrical power unit and said third member of said second planetary gear set for common rotation;

a second torque transmitting mechanism selectively interconnecting said third member of said second planetary gear set with a stationary member;

a third torque transmitting mechanism selectively interconnecting said second electrical power unit with said third member of said third planetary gear set for common rotation;

a fourth torque transmitting mechanism selectively interconnecting said third member of said third planetary gear set with said stationary member; and said torque transmitting mechanisms being operated in combinations of two to establish three modes of power transmission between said input shaft and said output shaft.

2. The electrically-variable transmission defined in claim 1 further comprising:

said second and fourth of said torque transmitting mechanisms being engaged to establish an input split mode of power transmission;

said first and fourth of said torque transmitting mechanisms being engaged to establish a first compound split mode of power transmission; and said first and third of said torque transmitting mechanisms being engaged to establish a second compound split mode of power transmission.

3. The electrically-variable transmission defined in claim 2 further comprising:

said first electrical power unit and said third member of said second planetary gear set being substantially stationary during an interchange between said input split mode and said first compound split mode; and said second electrical unit and said third member of said third planetary gear set being substantially stationary during and interchange between said first compound split mode and said second compound split mode.

4. The electrically-variable transmission defined in claim 2 further comprising:

said torque transmitting mechanisms each being selectively engageable fluid-operated friction torque transmitting mechanisms, said first and third torque transmitting mechanisms being clutches and said second and fourth torque transmitting mechanisms being brakes.

5. The electrically-variable transmission defined in claim 2 further comprising:

said first torque transmitting mechanism being a mechanical sliding clutch and said second torque transmitting mechanisms being mechanical sliding brake, said first and second torque transmitting mechanisms having a central overlapping condition wherein both of said torque transmitting mechanisms are operable to hold the second member of said first planetary gear set stationary.

6. The electrically-variable transmission defined in claim 2 further comprising:

a source of mechanical power for supplying power to said input shaft;

means for connecting said source of mechanical power to said input shaft; and an electrical storage means for supplying electrical power to and receiving electrical power from said first and second electrical power units.

7. The electrically-variable transmission defined in claim 1 further comprising:

said first member of first planetary gear set and said third member of said second planetary gear set both being ring gear members;

said third member of said first planetary gear set, said first member of said second planetary gear set, and said second member of said third planetary gear set each being planet carrier assembly members;

said second member of said first planetary gear set and said second member of said second planetary gear set both being sun gear members;

said first member of said third planetary gear set being any one of a group consisting of a ring gear member and a sun gear member; and said third member of said third planetary gear set being the member of the group that is not said first member.

8. An electrically-variable propulsion system comprising:

a transmission input shaft;

a source of mechanical power for supplying power to said input shaft;

means for connecting said source of mechanical power to said input shaft;

a first planetary gear set having first, second, and third members, said first member being continuously interconnected with said input shaft;

a first electrical power unit continuously interconnected with said second member of said first planetary gear set;

a second planetary gear set having first, second, and third members with said first member being continuously interconnected with said third member of said first planetary gear set;

a second electrical power unit continuously interconnected with said second member of said second planetary gear set;

an electrical power storage means for supplying electrical power to and receiving electrical from said first and second electrical power units;

a third planetary gear set having three members, said first member being continuously interconnected with both said third member of said first planetary gear set and with said first member of said second planetary gear set, said second member of said third planetary gear set being continuously interconnected with a transmission output shaft;

a first torque transmitting mechanism selectively interconnecting said first electrical power unit and said third member of said second planetary gear set for common rotation;

a second torque transmitting mechanism selectively interconnecting said third member of said second planetary gear set with a stationary member;

a third torque transmitting mechanism selectively interconnecting said second electrical power unit with said third member of said third planetary gear set for common rotation;

a fourth torque transmitting mechanism selectively interconnecting said third member of said third planetary gear set with said stationary member; and said torque transmitting mechanisms being operated in combinations of two to establish three modes of power transmission between said input shaft and said output shaft.

* * * * *